(12) United States Patent
Mohan

(10) Patent No.: US 9,110,970 B2
(45) Date of Patent: Aug. 18, 2015

(54) DESTRUCTURING AND RESTRUCTURING RELATIONAL DATA

(75) Inventor: Mukund Mohan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 12/939,865

(22) Filed: Nov. 4, 2010

(65) Prior Publication Data

US 2011/0060769 A1    Mar. 10, 2011

Related U.S. Application Data

(63) Continuation-in-part of application No. 12/179,903, filed on Jul. 25, 2008, now Pat. No. 8,943,087.

(51) Int. Cl.
*G06F 7/00* (2006.01)
*G06F 17/30* (2006.01)

(52) U.S. Cl.
CPC .................. *G06F 17/30604* (2013.01)

(58) Field of Classification Search
CPC .......... G06F 17/3056; G06F 17/30569; G06F 17/30595; G06F 17/30864
USPC ......................................................... 707/808
See application file for complete search history.

(56) References Cited

U.S. PATENT DOCUMENTS

| | | | |
|---|---|---|---|
| 6,574,619 B1 * | 6/2003 | Reddy et al. ........................ | 1/1 |
| 6,615,253 B1 | 9/2003 | Bowman-Amuah | |
| 6,718,320 B1 * | 4/2004 | Subramanian et al. ....... | 707/719 |
| 6,785,667 B2 * | 8/2004 | Orbanes et al. ........................ | 1/1 |
| 6,947,929 B2 | 9/2005 | Bruce et al. ........................ | 707/5 |
| 7,035,855 B1 * | 4/2006 | Kilger et al. .................. | 707/703 |
| 7,133,865 B1 | 11/2006 | Pederson et al. .............. | 707/103 |
| 7,249,241 B1 * | 7/2007 | Chu et al. ....................... | 711/202 |
| 7,257,597 B1 * | 8/2007 | Pryce et al. ........................... | 1/1 |
| 7,533,107 B2 * | 5/2009 | Gupta et al. .......................... | 1/1 |
| 7,533,122 B2 * | 5/2009 | Drumm et al. ........................ | 1/1 |
| 7,680,879 B2 | 3/2010 | Battat et al. | |
| 7,720,803 B2 * | 5/2010 | Unnebrink et al. ........... | 707/601 |

(Continued)

FOREIGN PATENT DOCUMENTS

| | | | |
|---|---|---|---|
| WO | WO 2005/019997 | 3/2005 | |
| WO | WO 2005/106711 | 11/2005 | .............. G06F 17/30 |

OTHER PUBLICATIONS

Astrova, Irina, Nahum Korda, and Ahto Kalja. "Storing OWL ontologies in SQL relational databases." International Journal of Electrical, Computer and Systems Engineering 1.4 (2007): 242-247.*

(Continued)

*Primary Examiner* — Mark E Hershley
(74) *Attorney, Agent, or Firm* — Sughrue Mion, PLLC

(57) ABSTRACT

A computer system selects a first database corresponding to a first schema and a second database corresponding to a second schema. The computer system then generates a schema table based upon the selected databases. Next, the computer system destructures the schema table, which includes a first entry corresponding to the first database and a second entry corresponding to the second database. The computer system then selects a property map that links the first entry to the second entry, and restructures the destructured schema table using the selected property map, resulting in a restructured schema table. In turn, the computer system processes a user query using the restructured schema table.

20 Claims, 15 Drawing Sheets

(56) References Cited

U.S. PATENT DOCUMENTS

| | | | |
|---|---|---|---|
| 7,836,097 B2* | 11/2010 | Blackstone et al. | 707/803 |
| 7,840,589 B1 | 11/2010 | Holt et al. | |
| 7,865,461 B1 | 1/2011 | Best et al. | |
| 8,505,027 B2* | 8/2013 | Warner et al. | 719/312 |
| 2002/0059566 A1 | 5/2002 | Delcambre et al. | |
| 2002/0169788 A1* | 11/2002 | Lee et al. | 707/104.1 |
| 2003/0018616 A1* | 1/2003 | Wilbanks et al. | 707/2 |
| 2003/0140308 A1* | 7/2003 | Murthy et al. | 715/500 |
| 2004/0034651 A1 | 2/2004 | Gupta et al. | |
| 2004/0054683 A1* | 3/2004 | Nishizawa et al. | 707/102 |
| 2004/0064456 A1 | 4/2004 | Fong et al. | |
| 2004/0122646 A1* | 6/2004 | Colossi et al. | 703/22 |
| 2004/0139095 A1* | 7/2004 | Trastour et al. | 707/100 |
| 2005/0043940 A1 | 2/2005 | Elder | |
| 2005/0102297 A1 | 5/2005 | Lloyd et al. | |
| 2005/0216500 A1* | 9/2005 | Edelstein et al. | 707/102 |
| 2005/0273314 A1 | 12/2005 | Chang et al. | |
| 2006/0038084 A1 | 2/2006 | Fussell et al. | |
| 2006/0074858 A1* | 4/2006 | Etzold et al. | 707/3 |
| 2006/0136376 A1* | 6/2006 | Jain et al. | 707/3 |
| 2006/0136452 A1* | 6/2006 | Lim et al. | 707/101 |
| 2006/0143239 A1 | 6/2006 | Battat et al. | |
| 2006/0167856 A1* | 7/2006 | Angele et al. | 707/3 |
| 2006/0218157 A1 | 9/2006 | Sourov et al. | 707/100 |
| 2007/0136323 A1* | 6/2007 | Zurek et al. | 707/100 |
| 2007/0156623 A1 | 7/2007 | Zhang | |
| 2007/0203923 A1* | 8/2007 | Thomas | 707/100 |
| 2007/0208697 A1 | 9/2007 | Subramaniam et al. | |
| 2007/0214145 A1* | 9/2007 | Subramaniam et al. | 707/10 |
| 2007/0260620 A1 | 11/2007 | Smolen et al. | |
| 2008/0021888 A1 | 1/2008 | Miller | |
| 2008/0027981 A1* | 1/2008 | Wahl | 707/103 R |
| 2008/0040308 A1* | 2/2008 | Ranganathan et al. | 707/1 |
| 2008/0059524 A1* | 3/2008 | Biedenstein et al. | 707/104.1 |
| 2008/0077598 A1 | 3/2008 | Wilmering et al. | |
| 2008/0168420 A1 | 7/2008 | Sabbouh | 717/104 |
| 2008/0243908 A1 | 10/2008 | Aasman et al. | |
| 2009/0024590 A1 | 1/2009 | Sturge et al. | |
| 2009/0043730 A1* | 2/2009 | Lavdas et al. | 707/2 |
| 2009/0070391 A1* | 3/2009 | Blair et al. | 707/203 |
| 2009/0077094 A1 | 3/2009 | Bodain | |
| 2009/0144293 A1* | 6/2009 | Chowdhury | 707/100 |
| 2009/0150367 A1* | 6/2009 | Melnik et al. | 707/4 |
| 2010/0049728 A1* | 2/2010 | Chiticariu et al. | 707/101 |
| 2010/0138366 A1 | 6/2010 | Zhang | |
| 2010/0192057 A1 | 7/2010 | Majidian | 715/237 |

OTHER PUBLICATIONS

Hu et al., "Research and Implementation of Domain-Specific Ontology Building from Relational Database," IEEE, Proceedings of the 3rd ChinaGrid Annual Conference, ChinaGrid 2008, p. 289-293, 2008.

Zhou et al., "Tool for Translating Relational Databases Schema Into Ontology for Semantic Web," IEEE Computer Society, 2nd International Workshop on Education Technology and Computer Science, ETCS 2010, v 1, p. 198-201, 2010.

Nyerges et al., "Schema integration analysis for the development of GIS databases," International Journal of Geographical Information Science, vol. 3, Issue 2, Apr. 1989, pp. 153-183.

Duong et al., "XML Database Schema Integration Using XDD," Springer Berlin/Heidelberg, Book Chapter, Book Series Lecture Notes in Computer Science, Advances in Web-Age Information Management, 2003.

Imhoff, "Active Data Warehousing—the Ultimate Fulfillment of the Operational Data Store," Intelligent Solutions, Inc., 2001; pp. 1-14.

Inmon, "DW 2.0—Architecture for the Next Generation of Data Warehousing" Corporate Information Factory (CIF) Resources, Inmon Data Systems, Apr. 2006, pp. 1-4.

"Operational Intelligence: A Process-Aligned Collaborative Environment" by InetSoft Technology Corporation, Knowledgestorm, Jun. 2006, 4 pages.

"Web Ontology Language (OWL)", W3C Semantic Web Activity; Sep. 2007, pp. 1-3.

Williams, "The Associative Model of Data", Second Edition, Lazy Software, Ltd.., Answerbrisk Ltd., 2003, 17 pages.

Hegner, Stephen J., "Limitations of the Relational Model," Lecture Notes, Senior Lecturer, Umea University, Sweden, published 2005.

Inmon, "The Changing World, Part 1," BeyeNetwork, Oct. 26, 2006, 18 pages.

"Semantic Data Integration for the Enterprise—Oracle Semantic Technologies," SemanticUniverse, Jan. 14, 2009, 3 pages.

Inmon, "The Global Data Warehouse in DW2.0," Inmon Data Systems, 2006, 10 pages.

Schreiber, "Semantic Information Management (SIM): Solving The Enterprise Data Problem by Managing Data Based on Its Business Meaning," Unicorn Solutions, 2001-2003, 18 pages.

Inmon, "Building the Data Warehouse," John Wiley & Sons, 1993-2005, pp. 21-22.

* cited by examiner

DIMENSIONAL DATA MODEL OF OLAP

CONNECTION AMBIGUITY ACROSS MASTER ENTITIES

UNIFIED SEMANTIC INFORMATION MODEL OF OLAP2

LINKING MANY MASTER TABLES TO A MASTER (DIMENSION) TABLE

AGGREGATION OF INFORMATION ITEM TRIPLES

INFORMATION COMPOSITION FOR OLAP REPORT

EXTENDING OLAP REPORT TO MDM REPORT

DISTRIBUTED DATA PROCESSING SYSTEM

1010

| SALES ANALYSIS RELATIONAL SCHEMA TABLE | | |
|---|---|---|
| TABLE NAME | COLUMN NAME | CONSTRAINT |
| FACT_SALES | TIME_ID | FK |
| | CUST_ID | FK |
| | ITEM_ID | FK |
| | SALESMAN_ID | FK |
| | SALES_AMT | NULL |
| | SALES_QTY | NULL |
| | FREIGHT_CHARGES | NULL |
| DIM_TIME | TIME_ID | PK |
| | DT | NULL |
| | MONTH | NULL |
| | QUARTER | NULL |
| DIM_CUST | CUST_ID | PK |
| | COMPANY_NAME | NULL |
| | CUST_TYPE | NULL |
| DIM_ITEM | ITEM_ID | PK |
| | ITEM_DESC | NULL |
| | RATING | NULL |
| | CATEGORY | NULL |
| DIM_TERRITORY | SALESMAN_ID | PK |
| | SALESMAN_NAME | NULL |
| | TERRITORY | NULL |

| DESTRUCTURED RELATIONAL SCHEMA ||
|---|---|
| OWL:Class | OWL:Individual |
| Cube | Sales_Analysis |
| Fact | SALES |
| Dimension | DIM_TIME |
| Dimension | DIM_CUST |
| Dimension | DIME_ITEM |
| Dimension | DIME_TERRITORY |
| Table | FACT_SALES |
| Table | DIM_TIME |
| Table | DIM_CUST |
| Table | DIM_ITEM |
| Table | TIM_TERRITORY |
| Column | TIME_ID |
| Column | CUST_ID |
| Column | ITEM_ID |
| Column | SALESMAN_ID |
| Column | SALES_AMT |
| Column | SALES_QTY |
| Column | FREIGHT_CHARGES |
| Column | DT |
| Column | MONTH |
| Column | QUARTER |
| Column | CUST_ID |
| Column | COMPANY_NAME |
| Column | CUST_TYPE |
| Column | ITEM_ID |
| Column | ITEM_DESC |
| Column | RATING |
| Column | CATEGORY |
| Column | SALESMAN_ID |
| Column | SALESMAN_NAME |
| Column | TERRITORY |
| Primary Key | TIME_ID |
| Primary Key | CUST_ID |
| Primary Key | ITEM_ID |
| Primary Key | SALESMAN_ID |
| Join_Condition | FACT_SALES.CUST_ID=CUSTOMER.CUST_ID |
| Join_Condition | FACT_SALES.DT=DIM_TIME.DT |
| Join_Condition | FACT_SALES.ITEM_ID=DIM_ITEM.ITEM_ID |
| Join_Condition | FACT_SALEMAN.SALESMAN_ID=TERRITORY.SALESMAN_ID |
| Hierarchy | Time_Hierarchy |
| Hierarchy | Customer_Hierarchy |
| Hierarchy | Territory_Hierarchy |

| OWL PROPERTY MAPS | |
|---|---|
| 1 | Schema hasFact Fact_Table hasMeasure Measure |
| 2 | Schema hasDimension Dimension_Table hasConstraint Constraint |

| PROPERTY MAP DIAGRAM REPRESENTATION | | | | | |
|---|---|---|---|---|---|
| | CLASS | PROPERTY | CLASS | PROPERTY | CLASS |
| Property Map | Schema | hasFact | Fact_Table | hasMeasure | Measure |
| Linked Individuals | SALES_ANALYSIS | hasFact | FACT_SALES | hasMeasure | SALES_AMT |
| ... | ... | ... | ... | ... | ... |

| RESTRUCTURED RELATIONSHIPS IN SCHEMA OBJECTS | |
|---|---|
| SERIAL | OWL:PROPERTY |
| 1 | Sales_analysis hasFact SALES |
| 2 | Sales_analysis hasDimension DIM_TIME |
| 3 | Sales_analysis hasDimension DIM_CUST |
| 4 | Sales_analysis hasDimension DIME_ITEM |
| 5 | Sales_analysis hasDimension DIME_TERRITORY |
| 6 | FACT_SALES hasColumn SALES_AMT |
| 7 | FACT_SALES hasColumn SALES_QTY |
| 8 | FACT_SALES hasColumn FREIGHT_CHARGES |
| 9 | DIM_TIME hasColumn DT |
| 10 | DIM_TIME hasColumn MONTH |
| 11 | DIM_TIME hasColumn QUARTER |
| 12 | DIM_CUST hasColumn COMPANY_NAME |
| 13 | DIM_CUST hasColumn CUST_TYPE |
| 14 | DIM_ITEM hasColumn ITEM_DESC |
| 15 | DIM_ITEM hasColumn RATING |
| 16 | DIM_ITEM hasColumn CATEGORY |
| 17 | DIM_TERRITORY hasColumn TERRITORY |
| 18 | DIM_TERRITORY hasColumn SALESMAN_NAME |
| 19 | DIM_CUST hasPK CUST_ID |
| 20 | DIM_TIME has PK TIME_ID |
| 21 | DIM_ITEM has PK ITEM_ID |
| 22 | DIM_TERRITORY hasPK SALESMAN_ID |
| 23 | SALES hasJoinCondition FACT_SALES.CUST_ID=CUSTOMER.CUST_ID |
| 24 | SALES hasJoinCondition FACT_SALES.DT=DIM_TIME.DT |
| 25 | SALES hasJoinCondition FACT_SALES.ITEM_ID=DIM_ITEM.ITEM_ID |
| 26 | SALES hasJoinCondition FACT_SALES.SALESMAN_ID=TERRITORY.SALESMAN_ID |
| 27 | QUARTER hasLevel MONTH |
| 28 | MONTH hasLevel DATE |
| 29 | Customer_Hierarchy hasLevel TYPE |
| 30 | TYPE hasLevel CUSTOMER |
| 31 | Territory_Hierarchy hasLevel TERRITORY |
| 32 | Territory hasLevel SALESMAN |
| 33 | Time_Hierarchy hasLevel QUARTER |

*FIG. 14*

DESTRUCTURING AND RESTRUCTURING RELATIONAL DATA

RELATED APPLICATION

This application is a continuation-in-part (CIP) to the following co-pending U.S. patent application with at least one common inventor and assigned to the same assignee: application Ser. No. 12/179,903 filed on Jul. 25, 2008 and titled "Processing Data from Diverse Databases."

TECHNICAL FIELD

The present disclosure relates to reconstructing database object semantics and their corresponding inter-relationships. More particularly, the present disclosure relates to destructuring a relational schema table and restructuring the destructured relational schema table in order to provide a user with a single entry point to query multiple databases.

BACKGROUND

Online Analytical Processing (OLAP) enables enterprises to report, monitor and analyze their performance in an online environment. OLAP allows a user to drill down to identify product performance. Entity-relationship modeling specifies specific object types, such as "Product," "Customer," etc. In a relational model, the object types may be represented as names of relations, but may not have independent existence identification. As such, objects are indirectly identified and accessed through their corresponding attribute identification.

Entity-relationship modeling may also specify specific entities and relationships. In a relational model, identities of relationships may not have explicit representation, but rather recovered by executing query operations on the database.

SUMMARY

A computer system selects a first database corresponding to a first schema and a second database corresponding to a second schema. The computer system then generates a schema table based upon the selected databases. Next, the computer system destructures the schema table, which includes a first entry corresponding to the first database and a second entry corresponding to the second database. The computer system then selects a property map that links the first entry to the second entry, and restructures the destructured schema table using the selected property map, resulting in a restructured schema table. In turn, the computer system processes a user query using the restructured schema table.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings, wherein:

FIG. 11 is a table showing an example of a relational schema table;

FIG. 12 is a table that shows an example of a list of destructured relational schema;

FIG. 13A is a table showing an example of property maps that link different OWL Individuals based on structural information that exists in schema through a set of OWL Properties;

FIG. 13B is a table showing a property map diagram representation;

FIG. 14 is a table that shows restructured schema object relationships based upon the property maps shown in FIG. 13A and the destructured relational schema table shown in FIG. 12.

DETAILED DESCRIPTION

Figure 1:
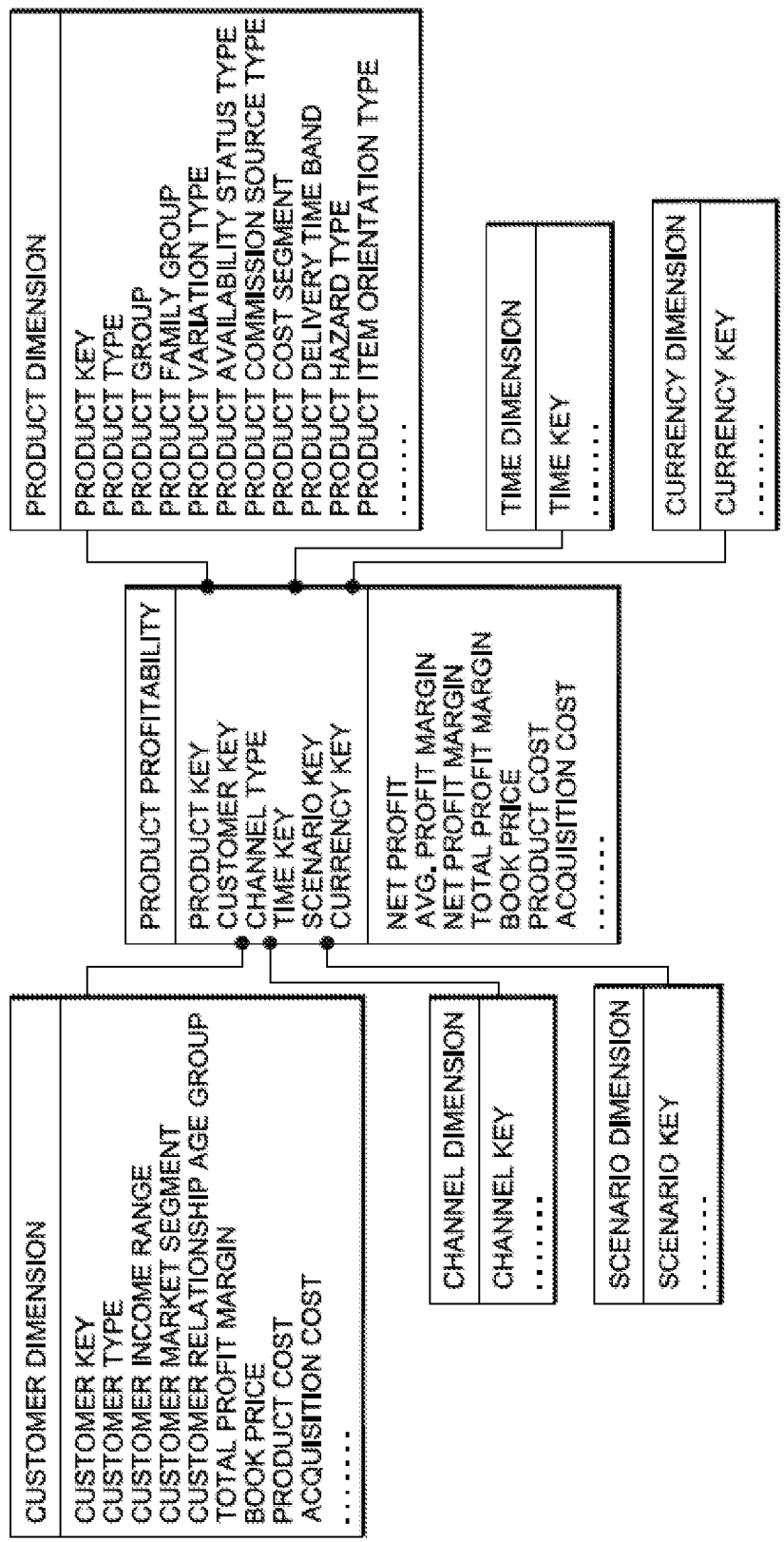
FIG. 1 shows a dimensional data model of OnLine Analytical Processing (OLAP)

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

The present disclosure provides methods and systems for analytically processing information items or data from diverse databases, and the preferred embodiment of the disclosure is well suited for enabling OnLine Analytical Processing (OLAP) data from databases of the type referred to as master databases (MDM). In one embodiment, terms such as "information items" may include both data and metadata.

Online Analytical Processing

OLAP is a commonly used technique of Business Intelligence (BI). Previously, calculating summaries of myriad transaction details and numbers was prohibitively expensive and time consuming in transaction databases due to slower processor speeds and memory constraints. To accelerate the process of producing management reports under these conditions, summaries were pre-computed in different and exhaustive ways and stored in databases specially designed for efficiently executing decision support queries. However, a challenge in this approach was determining the number of different ways in which business codes could be combined to summarize transaction amounts meaningfully.

Many retail companies have exclusive departments dedicated to codify business entities, such as items, vendors and employees, according to their own data standards. Representing them in terms of abbreviated codes is necessary for efficient data entry operations. However, many of these entities have their own classification hierarchy. Some others, such as Age Group and Annual Income Group, have many discrete categories, ranges or bands to classify customers.

OLAP recognizes these classification hierarchies and discrete categories as criteria necessary for grouping and aggregating transactions. In OLAP schemes, business data is divided into two main classes, which are dimension data and fact data. Fact data represents measurable results of business events and dimension data provides the context of measurement and events. Business codes and interrelationships among them are repurposed as dimensions, hierarchies and categories. The primary goal of OLAP is to organize them into count, sum, rank, and calculate other statistics of measures and facts. What was considered important was their unique identification numbers at the expense of the uniqueness of their identity.

OLAP is based on the principle of aggregation of measures such as Net Margin, Gross Margin, Average Margin in Product Profitability Business Solution Template of RBIS as shown in the FIG. 1. Some of the dimensions such as Product, Customer and Time may have hierarchy that acts as the basis for aggregation of measures. There is a one-to-many relationship between dimensions and the fact table. Should one ignore the existence of the fact table for a while, the schema essentially appears to be a many-to-many relationship between dimensions. Indeed, the fact table is, basically, a big associative entity that identifies each of its instances as a correspondence between them.

Master Data Model (MDM)

Business entities not only have unique identities, but they have rich, multi-faceted characters too. They have a distinct lifecycle of their own, comprising multiple stages, such as prospective customers, first-time customers and loyal customers. Retail companies built applications to capture this information and detail over a period of time with differing technologies and platforms to manage their lifecycle stages—one after the other. Often, each application is rooted to its proprietary database. Since many applications are available to account for their complete lifecycle, the same entity was functionally decomposed multiple times over, resulting in parallel worlds of data.

Seen as datasets, these applications are represented in terms of attributes characterizing specific stages and the purpose of application design. An application used for scouting for new customers is based on the attributes of a new customer. Another application that awards higher credit limits to loyal customers is based on an entirely different data model of "what is a customer?"

Two observations from the maze of applications, models, attributes and data are noted. Firstly, each application needs to uniquely identify an instance of an entity. As a result, multiple identifiers are created for the same item collectively among applications. Being different in type and format, these identifiers create difficulty in the reconciliation and exchange of data across applications. The first founding principle of MDM is to create unique identifiers once and only once in a central transaction process and lend them to all enterprise applications for reuse.

The second important observation is that applications responsible for managing different lifecycle stages need to process different transactions. They need autonomous databases to be designed based on data models of attributes characteristic to specific stages. These attributes are mutually exclusive across stages. All of these attributes are necessary to comprehensively describe a business entity. This leads to the second principle of MDM that mandates creation of a master copy of all characteristics attributes and synchronizes this master copy from time to time with the application specific databases.

Figure 2:
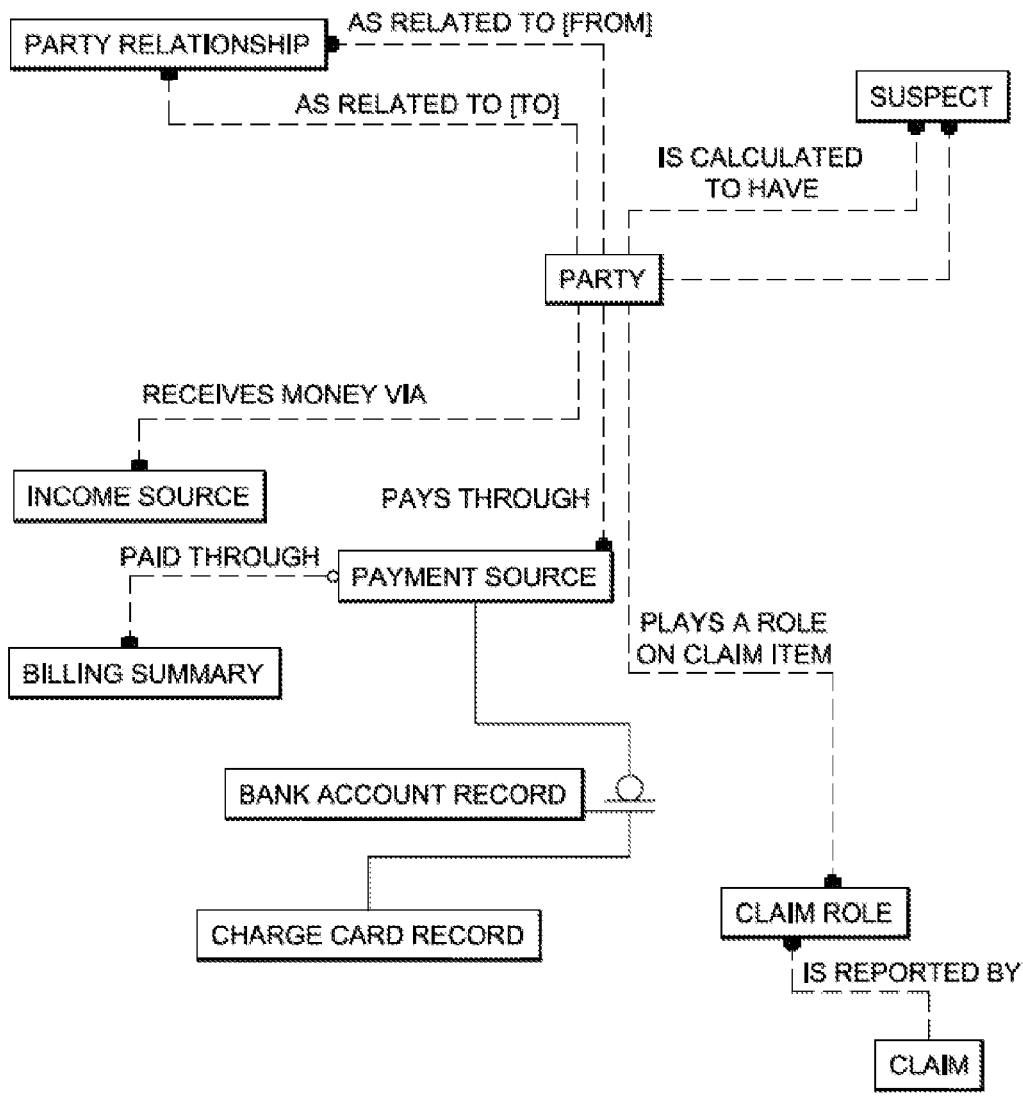
FIG. 2 shows a logical master data model that relates various business transactions.

While the primary goal of MDM is to aggregate transactions in which business entities participate, it also acts a common storage space for different views of the entities that are necessary to support various transactions. Rightly so, it is also called as a single repository of 360-degree view of Customer, Product, Location, Store etc. However in doing so, MDM establishes many associative entities between these master entities. At the logical level, Billing Summary, Payment, and Claim are some of the associative entities related to Party, also known as Customer, as shown in the FIG. 2.

While OLAP and MDM are very useful, it is believed that opportunities exist to expand the reach and range of traditional Business Intelligence solutions; in that, not only it could support queries to measure performance indicators, but also to a large number of characteristics, properties and attributes of master entities, also called as dimensions in the context of OLAP.

Often, the process of business analysis begins with a notion of felt-need, perception of concern such as dwindling sales, recurring stock-out, frequent returns of certain items and the likes. Under the circumstances, OLAP reports provide users with an objective understanding of a situation in at least two ways. First, the OLAP reports present a choice of analysis areas, such as Product Profitability Analysis, Product Analysis, Planning & Forecasting Analysis, Vendor Performance Analysis, Service Delivery Analysis etc.; and the OLAP reports describe these analysis areas in terms of specific measures, which users can further choose from and examine trends and frequencies. Second, the OLAP reports also unfold hierarchies of related dimensions for the users to report their relative contribution to measures, such as Net Profit by Product Type or even individual Stores. By predefining threshold values of measures, they may also report exceptions as and when they arise. From a maze of items that a company deals in, the OLAP reports are valuable means to detect a few of these items that call for greater attention and time.

What is treated as secondary objects, an explanatory device and used as search criteria in the BI context is the primary subject of occupation in the MDM context. While the former uses their identifiers for counting numbers and summing transactions, the latter builds upon their uniqueness. However, both worlds of data dwell upon a common idea of unique identity. In a situation where representation of identity is the same across them, a new opportunity is created to extend the reach and range of BI. Master data can be brought to reveal operational details of under-performing entities. Though BI gives an overall idea about the well being of a business, it is not envisaged as an operational system. MDM not only provides their complete details but also acts as a single entry point to a spectrum of transaction applications that companies run.

Both dimensional data model and master data model are based on many-to-many relationships among business entities. Both performance measures and business transactions need associative entities for their representation and storage of data. The idea of associative entity serves well the purpose of storing data without any anomalies. However, it comes at a cost. First, all roles and relationships that are established during logical modeling are destroyed in physical databases. Secondly, joining across multiple associative entities and reconstructing relationships is fraught with the 'fan trap' and the 'chasm trap' problems.

The challenge is to create unambiguous, explicit and transparent relationships among business entities that could be seen, read and understood by end users. It should be possible to visit databases and aggregate roles and relationships in which they stand in relation to others. Users should be able to comprehend the kaleidoscopic nature of business entities and from there to query all models of decomposition and parallel worlds of existence. It should be possible to construct a single, even though virtual, world of their manifestation.

Online analytical processing is not a process of analysis in itself. By definition, analysis is a process of decomposing a whole into its constituent parts so that they could be individually studied. In contrast, analytical processing puts data in the context of its occurrence so that corresponding business events, regularities and exceptions could be studied from many perspectives. By correlating fact data with dimension data, and then aggregating it along dimensional hierarchies, analytical processing creates a multi-dimensional data cube to enable business analysis. Clearly, it is a process of synthesizing or composing meaningful information from less-meaningful data.

A classical OLAP follows a two-step method to process creation of data cubes. First, it separates contextual data from factual data, and then puts them back together in an architected schema so that they may be related to each other in controlled and relevant ways. Central to the approach is a desire to extract data from diverse databases and tables from the system-of records, integrate them in a common data model and store them in a central database so that users get a single source of information all the time. Indeed, it is not a process of decomposition but composition, or to be more precise, a process of recomposition.

However, this approach accomplishes the goal by hard coding a notion of dimension in data models and databases. The primary purpose of dimensions is to act as search criteria. It pre-designates some items as subject of analysis and some others as criteria of analysis. By grouping equidimensional measures together in a schema, it further predefines the scope of analysis. Though it must follow the basic principles of relational database, the net result is that the path or trajectory of analytical processing is predefined, the role of participant entities are defined prior to the commencement of the process. It presents a still picture of information composition.

OLAP2 recognizes a fact that information composition is not a stationary process. In a seminal book on data warehousing, [see Inmon W. H., "An Introduction to Data Warehouse", Wiley & Sons, 1993] Inmon noted that users do not have a clear idea about their requirements of conducting analytical processing, initially. As users begin getting some data and reports, they refine their requirements, accordingly. The process begins with data and ends with requirements. In the course, an answer to a question generates more questions. What acts as a criterion of analysis itself becomes a subject of inquiry. Such a process does not have fixed termini, predefined dimensions, static trajectory of analysis and roots in a specific structure. The process unfolds as it proceeds.

The premise of OLAP2 is that some information items, whether called as entities, objects or instances, about which users are interested in knowing in detail, have proper names and, multiple meanings in different contexts of usage, interaction or action. Information, in itself, could be viewed through two different perspectives: as a dataset or as an identity. As a dataset, information ceases to have uniqueness of instances; all of them have the same structure. All datasets conformant by type and format are liable to be operated in the same way. However, an information item can also be accorded with a name, identity and identifier. In that, it gains in a characteristic persona of its own that is recognized to play multiple roles in different contexts. For example, a company may be characterized in terms of the roles that it plays such as Manufacturer, Supplier, Developer, Contractor, Innovator and the like.

From an identity perspective, there are two distinct types of information items: one, that has identity of its own having a unique identification number in a database, called as Business or Master Entities (ME) instances; and two, that does not have any unique identification number of its own but that is identified by means of a combination of others identification numbers, called as Associative Entities (AE) instances.

Information composition is a process of associating information items successively in such a way that establishes linkage across master entities by means of associative entities through their instances in a semantic or conceptual information model. In this way, it is possible to show all available instances of associative entities that stand in relation to the instances of master entities and vice versa, at a single level of abstraction, irrespective of their physical location in one or many data structures or databases.

Figure 3:
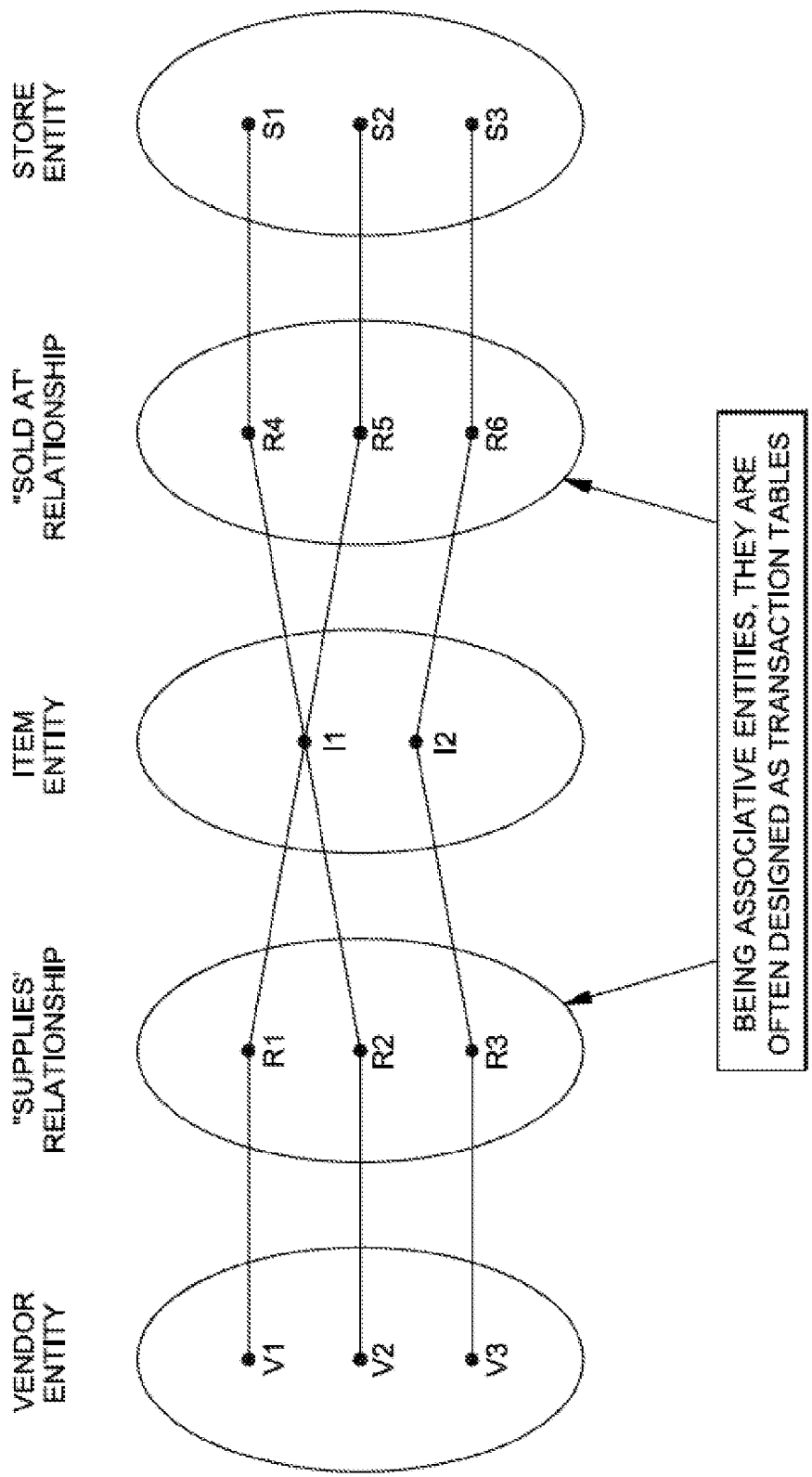
FIG. 3 depicts connection multiplicity across master entities.

As mentioned earlier, connecting or linking master entities in a sequential way is known to create connection traps; in that, they create multiplicity of identity of entity. For example, in the FIG. 3, there are three Master Entities as Vendors, Items and Stores. The Vendor Entity has three instances as V1, V2 and V3; the Item Entity has two instances I1 and I2; and the Stores Entity has three instances as S1, S2 and S3. In addition, there are two Associative Entities as "'Supplies' Relationship" and "'Sold in' Relationship"; each having three instances as R1, R2, R3, R4, R5 and R6, respectively. In this model, there are two Stores S1 and S2 that are linked to the Item I1, which, in turn, is connected to two Vendors V1 and V2. However, an instance of an item can exist in only one store at a time. Clearly, this representation creates an ambiguity in the identity of I1 due to multiple connections; as whether I1 exists in S1 or S2.

Although, from a transaction processing perspective, connecting instances of many Master Entities through relationships, that are themselves Associative Entities, may cause referential anomalies, it may be of interest to users to answer questions such as "Which Vendors supply Item I1?" and "Which Stores sell Item I1?" in the course of analytical processing. In this way, the problematic situation created in the context of transaction processing is turned as an opportunity for richer experience in analytical processing.

Figure 4:
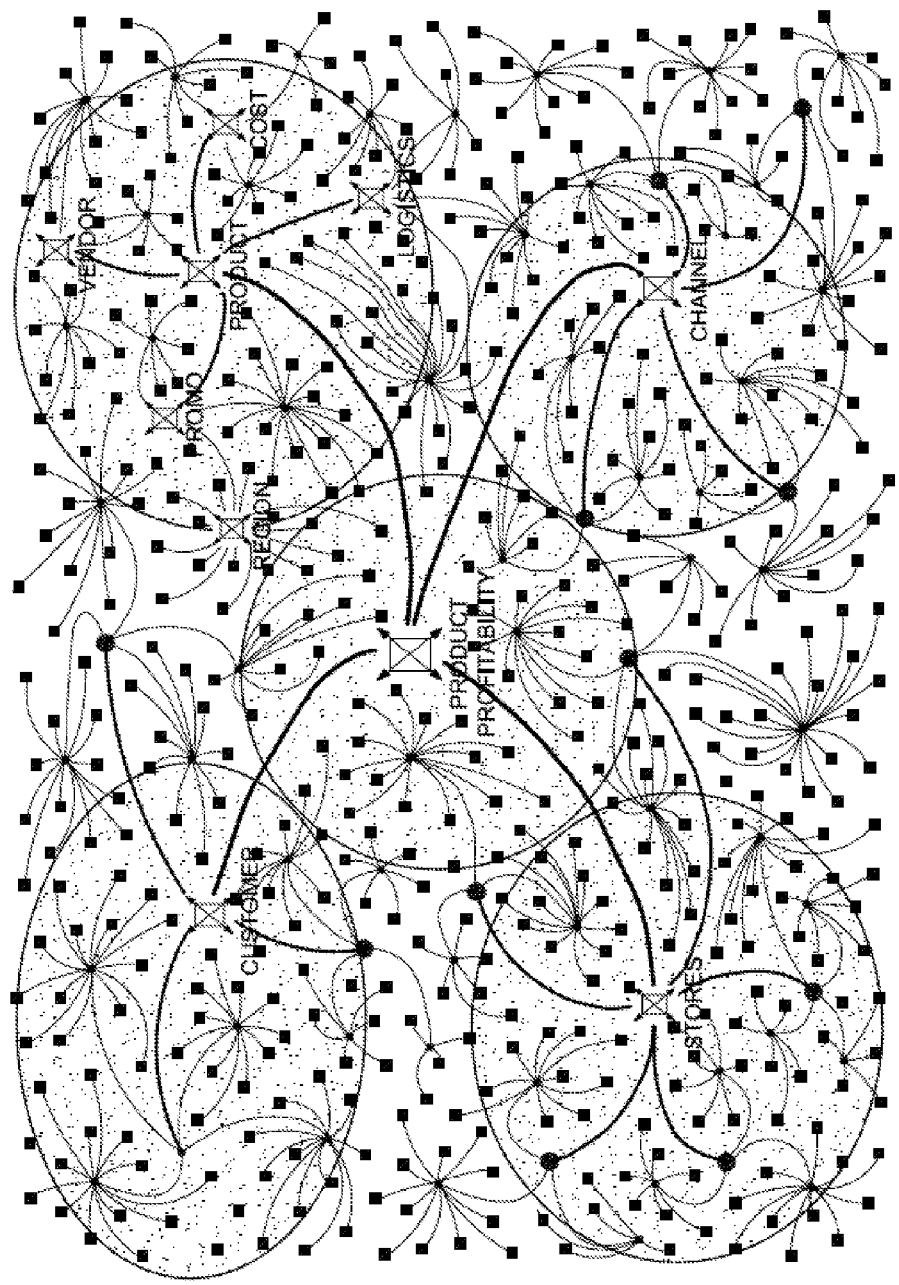
FIG. 4 depicts linking many master tables to a master (dimension) table.

The idea of linking Master Entities through Associative Entities not only provides an opportunity for leveraging connection multiplicity as multiple choices of individual instances to choose from for further analysis, it is also possible to link a Master Entity to many Associative Entities that in turn are connected to their respective Master Entities as shown in the FIG. 4. The entity Product Dimension (what is called as Dimension Table in the context of OLAP is nothing but the Master Tables of MDM, specially when Snowflake Schema is created in OLAP) is linked to Supply Details, Promotion Details, Cost Detail and General Details through Vendor Master, Campaign Master, Price Master and Brand Master, respectively. In this scenario, users would be able to navigate to multiple datasets related to the operational details of specific instances of Product entity. Furthermore, Campaign Master Entity could be used to drill across another OLAP cube, say Product Campaign Analysis. In this way, not only Dimensional Data Models could be linked to Master Data Models, but also discrete Dimensional models themselves could be interlinked for seamless analytical processing.

In order to accord independence to information items, OLAP2.0 uses a conceptual or semantic layer between the external schema or user views and the logical schema of databases. This intermediate, semantic layer describes conceptual building blocks to represent things in the real world and sets out rules about how they may be used. By aggregating relationships that they may have among themselves, their interactions could be modeled and presented in a unified semantic model, independent of data structures, enterprise applications and business processes.

Figure 7:
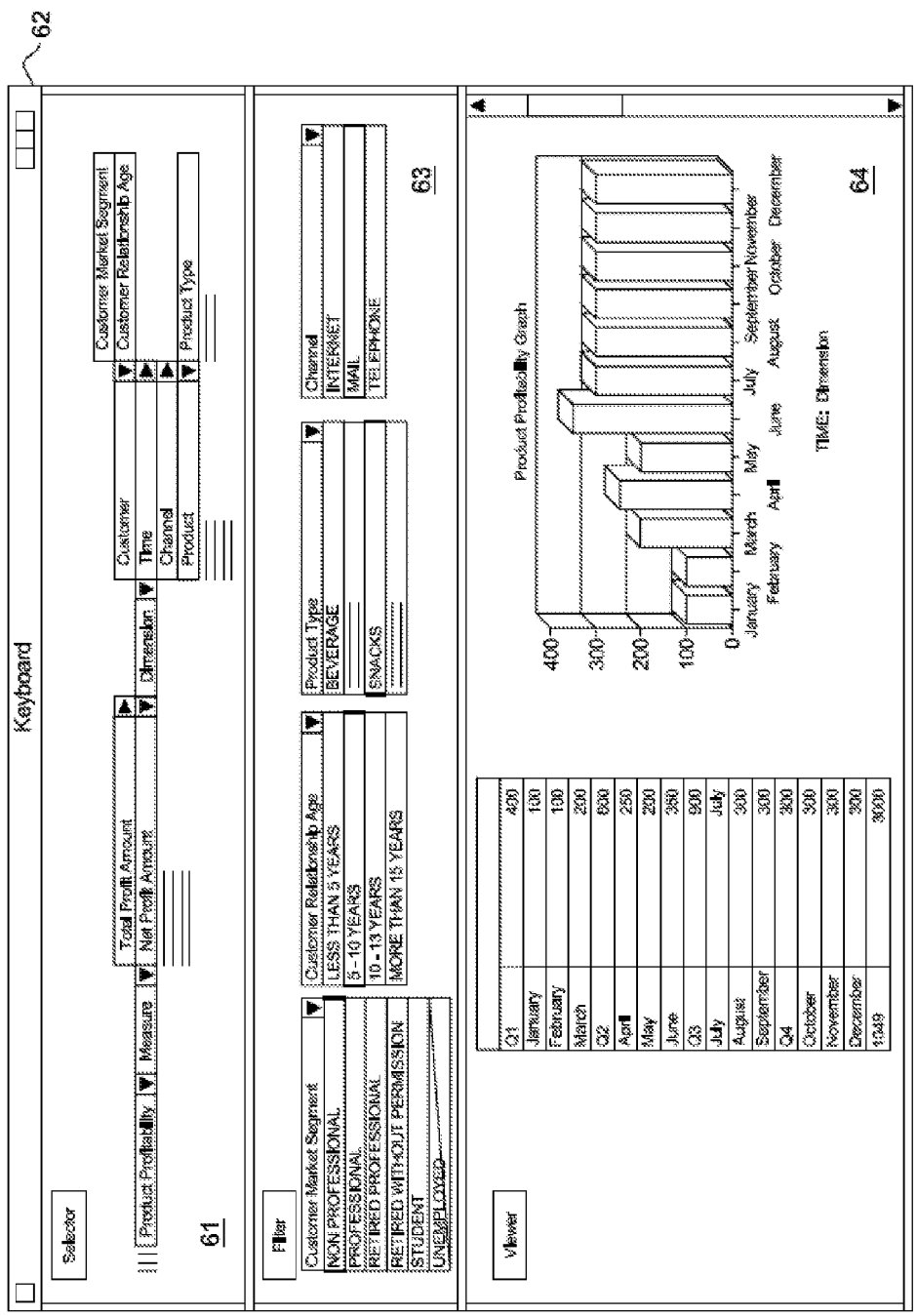
FIG. 7 shows the information composition for an OLAP report.

In a semantically unified environment, an information item can be described in many ways; in each way, it reveals a different role that it plays in relationship to others. In addition, it can be described by means of multiple predicates in the same role or context. For example, in the FIG. 7, the information item, "Net Profit Amount" can be predicated by means of four other information items as "Customer", "Time", "Channel" and "Product", while the context is "Measure";

thereby rendering the first information item as a multi-dimensional entity. In this environment, even the so-called dimension member, "Arrowroot Biscuits", in the FIG. 8, too could be associated with multiple predicates as "General Info", "Promotional Info", "Sourcing Info" and "Cost Info"; it amounts to having multi-dimensionalized even a non-numerical data type that is "Arrowroot Biscuits". One of the primary goals of OLAP2 is to get rid of an assumption of the dimensional data models which states that only numerical data types, including additive (such as monetary amounts), semi-additive (stock and inventory amounts) and non-additive (ratios) can be multi-dimensionalized. In this environment, all data types could be easily multi-dimensionalized.

Figure 5:
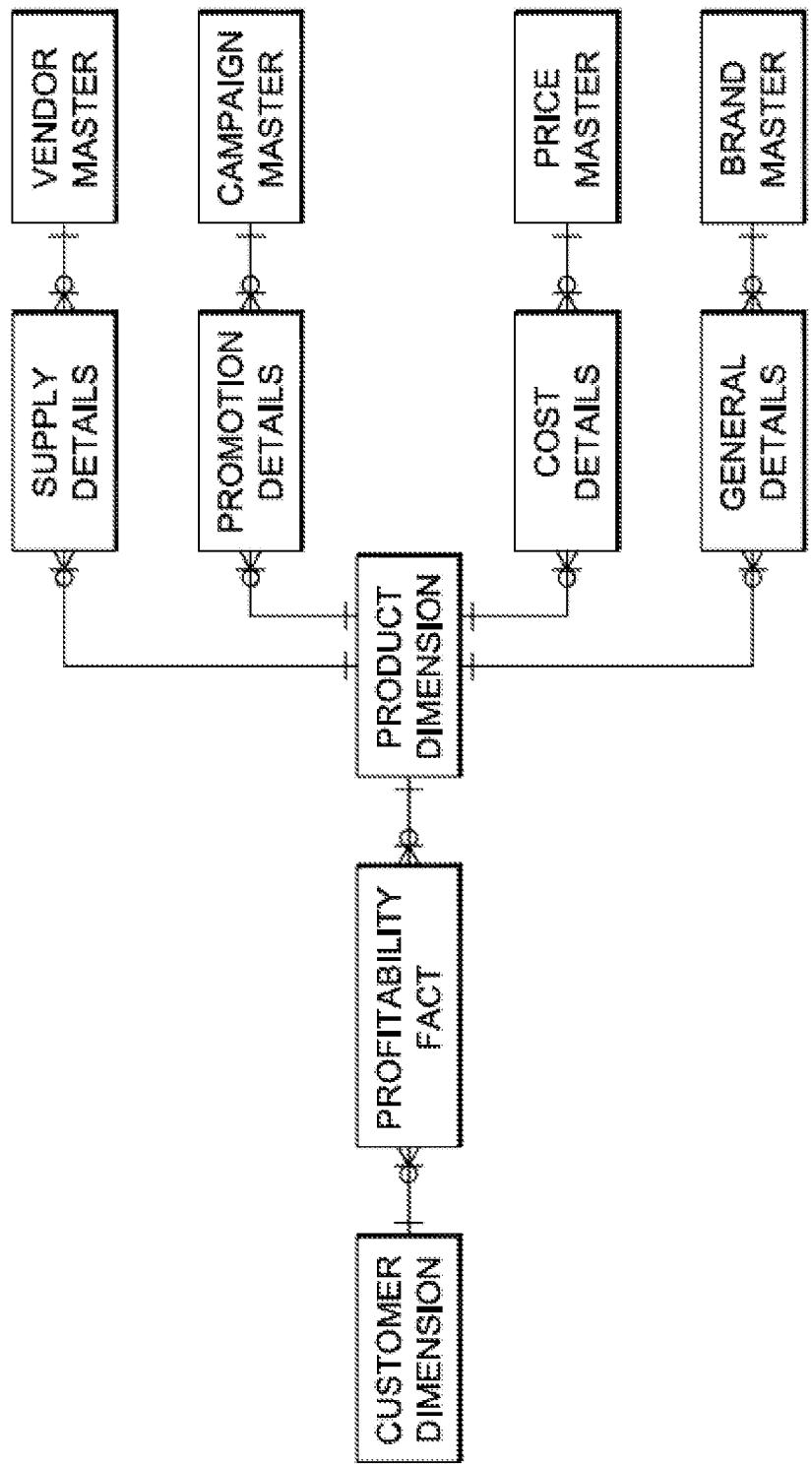
FIG. 5 shows a partial aggregation of triples from Retail Business Intelligence Solutions (RBIS)

This model is capable of easily accommodating multiple internal representations of information items. Often, it is found out that different departments of a company such as Finance, Marketing, Operations and Logistics have different definitions and derivation rules for measures such as Net Profit Amount and Inventory Level, for example. The vision of unified semantic information model of OLAP2.0 is illustrated in the FIG. 5. In this information model, users can select that items of their analytical interest and the model reveals all of their relationships, roles or internal representations that may exist in corporate databases and other data structures. In this representation, it is easy to map different subsets of nodes to multiple databases. As they continue with exercising their choices and making selection from the alternative path, the model keeps expanding until a time when required dataset is fetched from respective databases.

The model contains both entities and their instances as information items and links among them. The model exposes to users both the names and the values of data elements that could be used while formulating queries. By picking and choosing from the data elements, one could proceed in any direction. The model can produce both the collection of information items and query conditions that are required to formulate the context of a query and that could cause construction and validation of structured queries for submission to the underlying databases. On the one hand, the model demolishes structural boundaries of underlying databases; on the other hand, the model provides a common vocabulary to both business users and technical users.

OLAP2.0 (OLAPTUBE) Semantic Model

The foundation of OLAP2.0 is a semantic model. It is based on a triple representation of information in terms of subjects, verbs and predicates. It is based on an idea that there are two basic types of things in the real world: Entities and Associations.

Entities are those things that have discrete, independent existence. An entity's existence does not depend on any other thing. Some of the types of things that are entities are products, people, buildings and legal entities. The terms entity and item are used interchangeably herein.

Associations are those things whose existence depends on one or more other things, such that if any of those other things ceases to exist, then the thing itself ceases to exist or becomes meaningless. All measures and transactions are examples of associations and can be represented by means of links. In an absolute sense, a customer is an association between two legal entities. Some associations may depend upon another association; for example, a sales order may depend on a customer, which is itself an association. Associations are represented by Triples; the terms associations and triples are interchangeably used herein.

OLAP2.0 is discussed herein with reference to a sample scenario. In that, a case is analyzed where an OLAP Report reveals that products in a specific Product Type are not performing well in the market, and there is a need to investigate into specific products and their current information with a view to getting insight necessary to take corrective action. While analyzing further, user may get interested in any of the following areas of information. Cost Information, Promotional Information, Sourcing Information, Availability Information etc., in MDM. This scenario concludes by displaying Cost Information that is chosen by the user.

Information Items

Information items are parts of a composition that could be expressed as nouns and verbs, prepositions or conjunctions. This model assumes that things in the real world could be well described by means of only these parts of speech. In the sample scenario, the Product Profitability RBST is chosen to analyze sales performance of products. The elements of the schema could easily be listed as items; the Table 1 contains a partial list of such items. It is also feasible to generate information items from logical data model. For example, a small section of IBM WPC data model is used to list out a few items and included in the same Table 1. Irrespective of the logical data models involved while creating a semantic model, all uniquely named items are listed in a single table. In this list, both items and linking terms are given unique names.

TABLE 1

Information Items

| Item No. | Item Name |
|---|---|
| 01 | Product Profitability |
| 02 | Measure |
| 03 | Net Profit Amount |
| 04 | Dimension |
| 05 | Customer |
| 06 | Time |
| 07 | Channel |
| 08 | Product |
| 09 | Customer Market Segment |
| 10 | Customer Relationship Age |
| 11 | Product Type |
| 12 | Professional |
| 13 | Less Than 5 Years |
| 14 | 5-10 Years |
| 15 | 10-15 Years |
| 16 | More Than 15 Years |
| 17 | Snacks |
| 18 | Internet |
| 19 | Biscuit |
| 20 | Arrowroot Biscuit |
| 21 | Cost Info |
| 22 | Retail Price |
| 23 | Territory |
| 24 | Price |
| 25 | Effective Date |
| 26 | End Date |
| 27 | has |
| 28 | is |

Information Triples

In the same way that an entity is associated to other entities by means of logical relationships in a logical ERD (Entity Relationship diagram), items are combined using linking terms to form information triples in the format of <subject, verb, predicate> that would serve as assertions in the semantic model. Each of the three things of a triple could be either a link or an item. A partial list of such triples is presented in the Table 2.

TABLE 2

Information Item Triples

| Triple No. | Item Triple | Subject | Verb | Object |
|---|---|---|---|---|
| 51 | <01 - 27 - 02> | Product Profitability | has | Measure |
| 52 | <02 - 28 - 03> | Measure | is | Net Profit Amt |
| 53 | <03 - 27 - 04> | Net Profit Amt | has | Dimension |
| 54 | <04 - 27 - 08> | Dimension | is | Product |
| 55 | <08 - 28 - 11> | Product | has | Product Type |
| 56 | <11 - 28 - 17> | Product Type | is | Snacks |

Attributes as Associations

In day-to-day affairs, everything is described by associating it to other things. In a literal expression, words are practically positioned against each other by means of connecting words such as prepositions and other copula such as "is" and "has" relationships. In a typical Entity-Relationship diagram, entities are represented in terms of attributes. In this model, even attribute values are treated itself as an association and that can be expressed as triples. Some of the examples are presented in the Table 3.

TABLE 3

Attribute Values as Information Item Triples

| Triple No. | Item Triple | Subject | Verb | Object |
|---|---|---|---|---|
| 81 | <09 - 28 - 02> | Customer Mkt. Seg. | is | Non Professional |
| 82 | <09 - 28 - 03> | Customer Mkt. Seg | is | Professional |
| 88 | <10 - 28 - 14> | Customer Rel. Age | is | 5-10 Years |
| 98 | <11 - 28 - 17> | Product Type | is | Snacks |
| 99 | <07 - 28 - 18> | Channel | is | Internet |

Aggregating Information Triples

Figure 6:
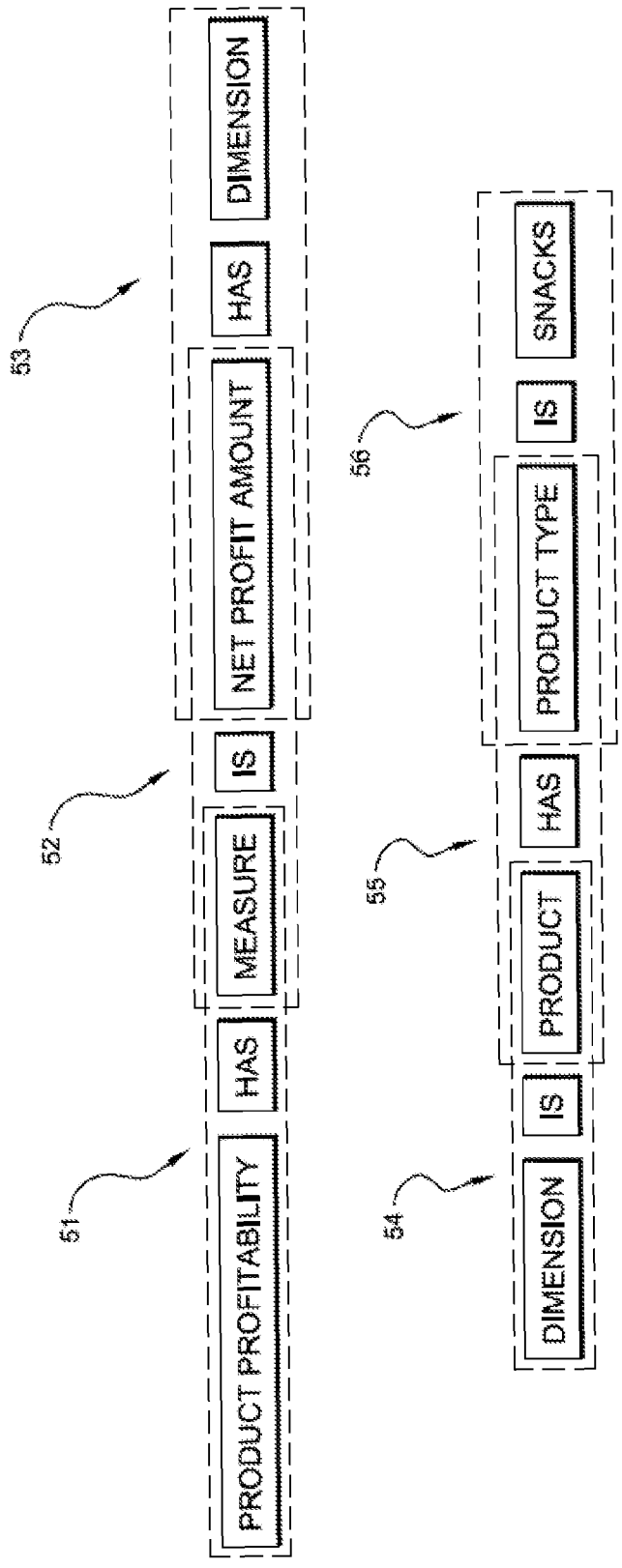
FIG. 6 illustrates a unified semantic model for the preferred embodiment of the disclosure, referred to as OLAP2.

Aggregating information triples produce information patterns that could be reused for composition. The triples represent basic building blocks, which are further combined to produce a higher level of abstraction of associations. In a recursive structure, triples are combined to fully represent a logical data model. In the Table 3, triples representing associations in RBIS are assembled together; this is again a partial representation of aggregation. More specifically, as shown in FIG. 6, as an example, a first triple 51 <Product Profitability-has-Measures> is assembled with a second triple 52 <Measure-is-Net Profit>, and this second triple is assembled with a third triple 53 <Net Profit-has-Value>.

Instantiating Information Composition

Not only can information triples be formed to represent an information model of business, but also the same process can be followed to assimilate the vocabulary of metadata of database, which is located in the database Catalog. Semantic information could be mapped onto the internal database objects, so that establishing database connection, composing and shipping valid queries to a target, such as RBIS BST database, could be realized. With reference to the FIG. 7, in the sample scenario, information composition is carried out through in the first panel 61, called Selector, of an application 62, called Keyboard. In the second panel 63, query conditions are selected specifying values of the four dimensions i.e., Customer Market Segment, Customer Relationship Age, Product Type and Channel. After executing queries in the database, the result set is formatted and rendered in the third panel 64.

Extending Information Composition

In the sample scenario, it is assumed that the user has studied the OLAP report. She discovered that the Profitability of the Snack group of Products is stagnant over the last two consecutive quarters, which is a source of concern to her business. Because new promotional schemes were launched, she was expecting to see an improvement in sales performance in this type of product. By staying in the same session of analysis, she would like to get a list of all products of Snacks type. It is further assumed that she zeroed down to the Biscuits category and finally selected Arrowroot Biscuits for a deeper analysis. Of all the information areas available for study, such as General Info, Promotional Info, Sourcing Info and Cost Info, she selected the last area for accessing current cost-related details.

One of the advantages of a semantic information model is its extensibility. It allows seamless remixing information from existing databases at a semantic level that is understandable by business users. In a scenario where MDM is implemented as the single, master source of data, RBIS dimensions would also be kept in synchronization with MDM. In this case, it is easy to extend RBIS triples over to MDM triples. New triples could be constructed during design. Additionally, triples could be created in the Production environment too without affecting the running system.

Figure 8:
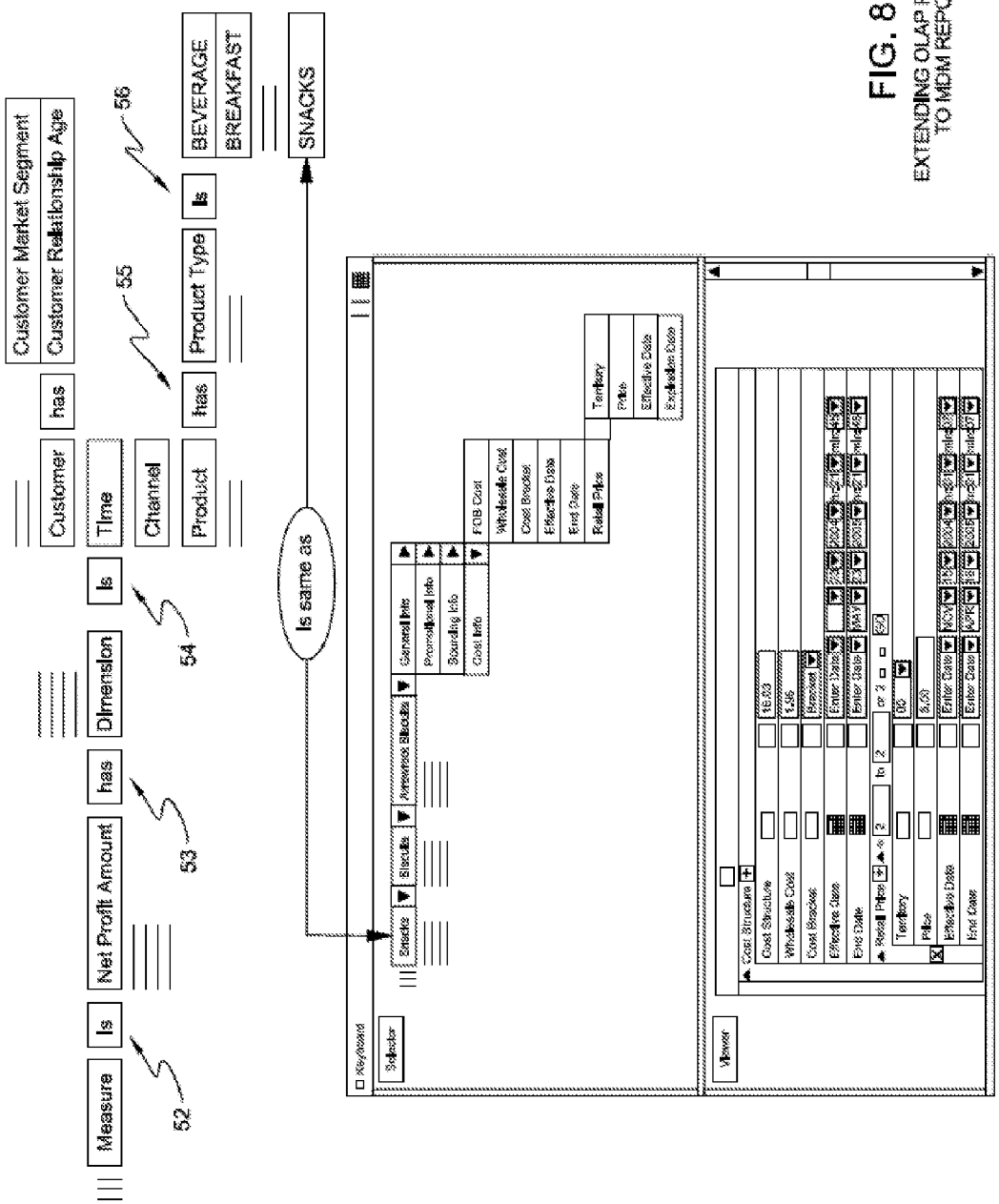
FIG. 8 illustrates extending the OLAP report to master databases (MDM)

Opening a single entry point to MDM, all of its information items could become visible to users during analytical processing. In the same scenario, the Snacks item of RBIS is defined as synonymous to Snacks item of Internal Merchandise Catalog of WPC, by creating a new triple as shown in FIG. 8. After executing queries in WPC database, the result is presented in the Keyboard panel 64. More specifically, in the example of FIG. 7, the triple 52 <Measure-is-Net Profit Amount> leads to the triple 53 <Net Profit Amount-has-Dimension>, and this triple leads to the triple 54 <Dimension-is-Product>. Triple 54 then leads to the triple 55 <Product-has-Product Type>, which in turn leads to the triple 56 <Product Type-is-snacks." This triple 56 then leads to a series of triples shown in the selector panel 61 of FIG. 7.

The preferred embodiment of the disclosure is based on the principal of triple data model. There are many alternative techniques and technologies, some open standards and some others as proprietary, available for system design and development. The most notable and promising technology for semantic engineering is of W3C OWL [see, OWL Web Ontology Language, http://www.w3.org/2004/OWL/]. Oracle has recently published a paper proposing it for designing a semantic model for integration of enterprise data [see, Semantic Data Integration for the Enterprise, www.opracle.com/technology/tech/semantic_technologies/pdf/semantic_grid_wp_0603.pdf]. The concept of Associative Model of Data proposed by Simon Williams [see, Simon W., "The Associative Model of Data", Lazy Software Ltd, 2002] is an interesting case, in this context. In facts, it is the key design principle of Kalido Dynamic Data Warehouse [see, Inmon W. H., "The Changing World", Kalido Active Information Management, November 2006]. Semantic mapping is an important part for creation of a unified information model for which IBM Unicorn [see, Scheiber Zvi, "Semantic Information Management", Unicorn (An IBM Company), 2003] provides a robust solution.

Online Analytical Processing is not a single-schema process. Instead, it is an iterative process that involves delving into data warehouses and operational databases, contextually. Business analysis is not an end in itself, but a means to design and redesign it. An important aspect of the present disclosure is the principal of relative dimension—the point amiss in all the existing solutions. It serves a single entry point for business intelligence to navigate the entire realm of master databases.

The preferred embodiment of the disclosure, as described above in detail, redefines the analytical process of business intelligence as a process of information composition, which is a process of inclusion and assimilation of data and structure. It is driven by a semantic information model that could equally gracefully expand to include both unstructured and semi-structured data too and contextualize them with structured enterprise data.

As will be readily apparent to those skilled in the art, the present disclosure, or aspects of the disclosure, can be realized in hardware, software, or a combination of hardware and software. Any kind of computer/server system(s)—or other apparatus adapted for carrying out methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the disclosure, could be utilized.

Figure 9:
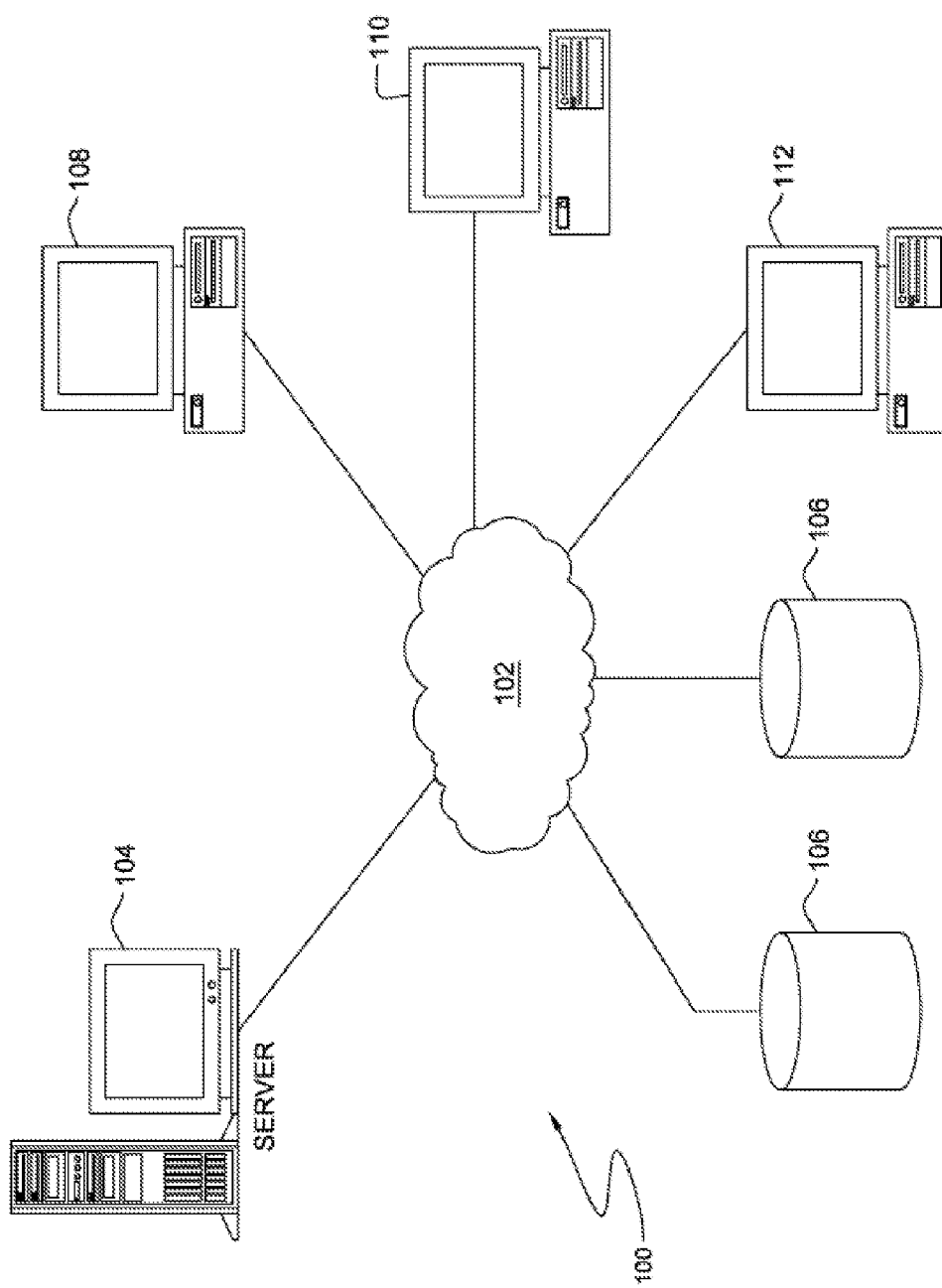
FIG. 9 shows an exemplary computer system providing multi database access in accordance with a preferred embodiment of the disclosure.

For example, FIG. 9 illustrates a computer system or distributed data processing system 100 which may be used in the implementation of the present disclosure. Distributed data processing system 100 is a network of computers in which the present disclosure may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, server 104 is connected to network 102, along with one or more storage units 106. In addition, clients 108, 110 and 112 are also connected to network 102. These clients 108, 110 and 112 may be, for example, personal computers or network computers. For purposes of this application, a network computer is any computer coupled to a network, which receives a program or other application from another computer coupled to the network. In the depicted example, server 104 provides data, such as boot files, operating system images, and applications, to clients 108, 110 and 112. Clients 108, 110 and 112 are clients to server 104. Distributed data processing system 100 may include additional servers, clients, and other devices not shown. In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet, a local area network (LAN), or a wide area network (WAN). FIG. 8 is intended as an example and not as an architectural limitation for the present disclosure.

Figure 10:
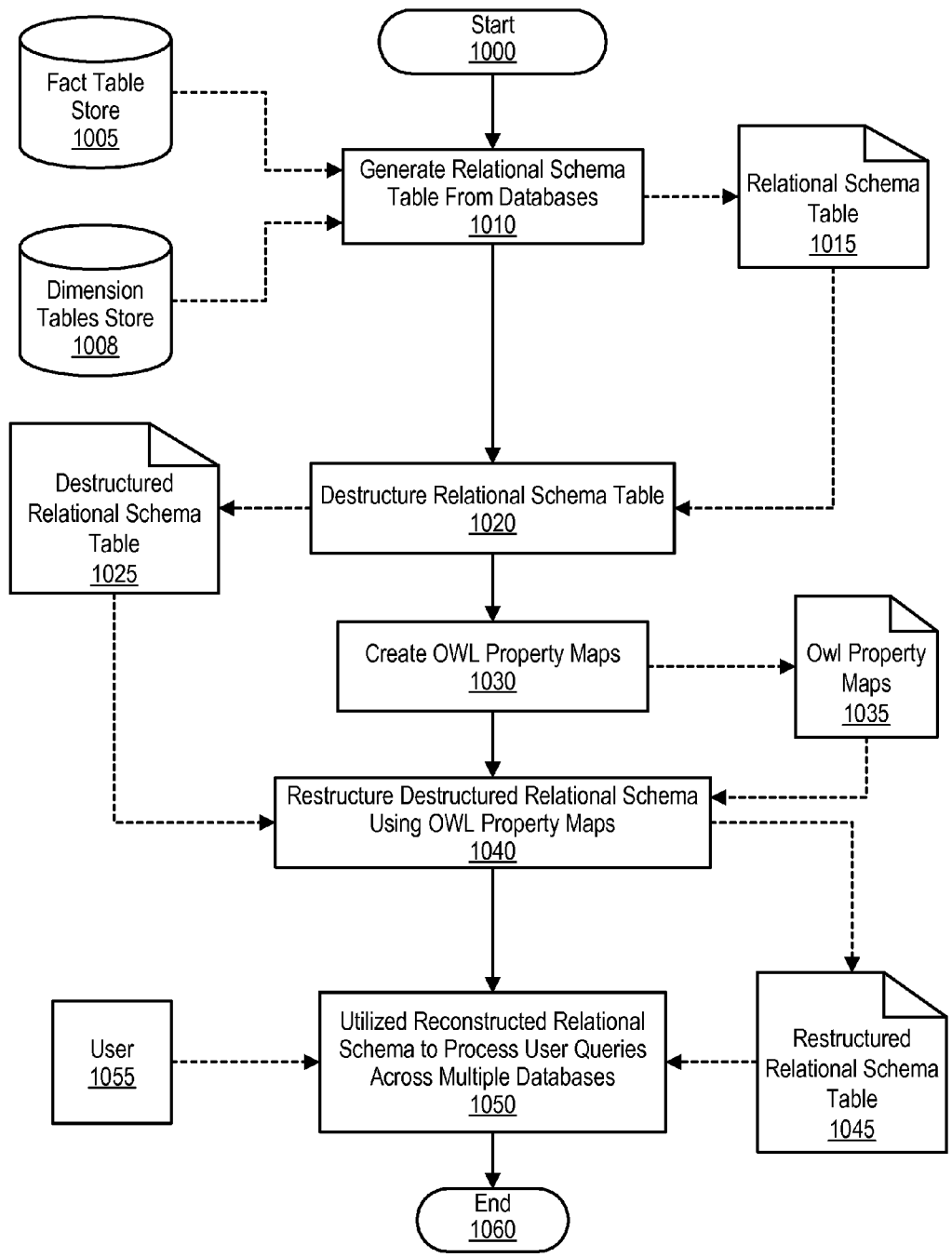
FIG. 10 is a flowchart showing steps taken in destructuring a relational schema table and restructuring the table using OWL property maps.

FIG. 10 is a flowchart showing steps taken in destructuring a relational schema table and restructuring the table using OWL property maps. Database object semantics and their corresponding inter-relationships are destructured and restructured in order provide a user with a single entry point for database queries and navigation over a variety of information resources. An ontological approach is disclosed herein, which utilizes a W3C Web Ontology Language (OWL) to generate a cross-referenced metadata network comprising classes, individuals and properties. In this regard, "items" and "links" previously discussed are synonymous with "owl:individuals" and "owl:properties," respectively. In addition, "items" are grouped in a set of generic categories referred to as "owl:classes," and "triples," or "owl: properties" are chained to reconstruct complete data object context. As such, this disclosure enables information navigation along with attaching "pre-built" analytics data artifacts directly to the data objects (e.g., reports, cubes, queries, etc.).

Processing commences at 1000, whereupon processing generates a schema table (relational schema table 1015) from data included in fact table store 1005 and dimension tables store 1008 (step 1010). Relational schema table 1015 includes a list of relational information such as table names, column names, and corresponding constraints (see FIG. 11 and corresponding text for further details). Fact table store 1005 and dimension table store 1008 may be stored on a volatile or nonvolatile storage area, such as computer memory or a computer hard drive.

At step 1020, processing disassembles (destructures) data objects in relational schema table 1015 from their corresponding schema, and generates a destructured schema table (destructured relational schema table 1025). In one embodiment, destructured relational schema table 1025 is a "flat file" that associates information included in relational schema table 1015 to OWL classes and OWL individuals (see FIG. 12 and corresponding text for further details).

Next, processing creates OWL property maps 1035 at step 1030 to link different OWL:Individuals included in destructured relational schema table 1025 based on the structural information that exists in the schema by means of a set of OWL:Properties. These links were discussed earlier as "triples" (see FIGS. 13A, 13B, and corresponding text for further details).

Using owl property maps 1035, processing restructures destructured relational schema table 1025 at step 1040, and generates a restructed schema table (restructured relational schema table 1045). Restructured relational schema table 1045 includes a list of OWL properties that loosely-couples database objects in order to extend the database objects over multiple databases for query purposes (see FIG. 14 and corresponding text for further details).

In turn, at step 1050, processing receives user queries from user 1055 and utilizes restructured relational schema table 1045 to process the user queries across multiple databases. Since restructured relational schema table 1045 is essentially a flat file, processing may directly search the contents of different databases through simple keyword-based searches. Processing ends at 1060.

FIG. 11 is a table showing an example of a relational schema table. Table 1010 shows an example of a star schema table, which includes a fact table referencing four dimension tables. As can be seen, table 1010 includes entries corresponding to a fact table (FACT_SALES) and entries corresponding to dimension tables (DIM_TIME, DIM_CUST, DIM_ITEM, and DIM_TERRITORY). The fact table may include a large amount of aggregated data (e.g., product information data), and the dimension tables may include attributes that describe the facts.

FIG. 12 is a table that shows an example of a destructured relational schema table. Relational schema, in one embodiment, may be metadata that includes schema names, table names, column names, and constraint names, along with details of their inter-relationships. In one embodiment, the metadata may be stored in a different database, such as a database catalog or repository table. Destructuring a relational schema table includes separating the corresponding metadata into its atomic constituents (e.g., schema objects or data objects), and including a list of these objects in destructured relational schema table 1025.

In one embodiment, each object may be an object type such as a schema name, table name, column name, or constraint name. In this embodiment, the object types are assigned to OWL:Classes, and each OWL:Individual is assigned to a corresponding OWL:Class. In short, in one embodiment, destructuring a schema table includes decomposing the metadata into atomic schema objects and assigning OWL:Individuals and their corresponding OWL:Classes to the data objects. As can be seen, table 1025 includes a list of entries resulting from destructuring relational schema table 1015 shown in FIG. 11.

FIG. 13A is a table showing an example of property maps that link different OWL:Individuals to each other based on structural information that exists in schema through a set of OWL:Properties. OWL:Individuals are linked among themselves in such a way that their inter-relationships are recomposed, restructured, and/or recreated in accordance with the structural integrity of the databases (metadata as stored in a database catalog).

Each inter-relationship is governed by means of a "property map" that, in one embodiment, represents a complete logical chain of individuals from a top-most parent OWL:Individual to the bottom-most child OWL:Individual (see FIG. 13B and corresponding text for further details). As can be seen, table 1035 includes information for which a "Property" links "Pairs" to Individuals drawn from respective OWL:Class by virtue of an "IS_A" (hasFact and hasMeasure) functional property of OWL formalism.

FIG. 13B is a table showing a property map diagram representation of table 1035's first property map shown in FIG. 13A. As can be seen, the property maps in table 1035 links the SALES_ANALYSIS schema (top-most parent OWL:Individual) to the FACT_SALES table to the SALES_AMT column name entry (bottom-most child OWL:Individual) shown in FIG. 10.

FIG. 14 is a table that shows restructured schema object relationships based upon property maps, such as those shown in FIG. 13A, and the destructured relational schema table shown in FIG. 12. In one embodiment, table 1045 is a flat file that comprises information relating to multiple databases. As can be seen, lines 1-5 identify the fact database tables and dimension database tables corresponding to table 1010 shown in FIG. 11. Lines 6-8 and 23 correspond to the FACT_SALES objects shown in table 1010. Lines 9-11 and 20 correspond to the DIM_TIME objects shown in table 1010. Lines 12-13 and 19 correspond to the DIM_CUST objects shown in table 1010. Lines 14-16 and 21 correspond to the DIM_TIME objects shown in table 1010. Finally, lines 17-18 and 22 correspond to the DIM_TERRITORY objects shown in FIG. 1010. In addition, lines 23-33 include entries that link a class from one database to a class of a different database or specify attributes of particular classes. As such, table 1045 allows a user to invoke a single query to query over multiple databases and/or database tables.

The present disclosure, or aspects of the disclosure, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Though the disclosure is exemplified by means of a business scenario taken from Retail Industry, it will be appreciated that it is equally applicable for business intelligence solutions in several other industries such as Healthcare, Telecommunication, Banking, Insurance, Manufacturing and the likes.

Also, it may be noted that the disclosure is described in such a way that is independent of technology. Today, there are multiple technologies available for realizing the system described herein; such as relational database technologies, associative database technologies, W3C Web Ontology Language-based, W3C Resource Description Framework-based technologies among others.

While it is apparent that the disclosure is well calculated to fulfill the objects stated above, it will be appreciated that numerous modifications and embodiments may be devised by those skilled in the art, and it is intended that the appended claims cover all such modifications and embodiments as fall within the true spirit and scope of the present disclosure.

Figure 15:
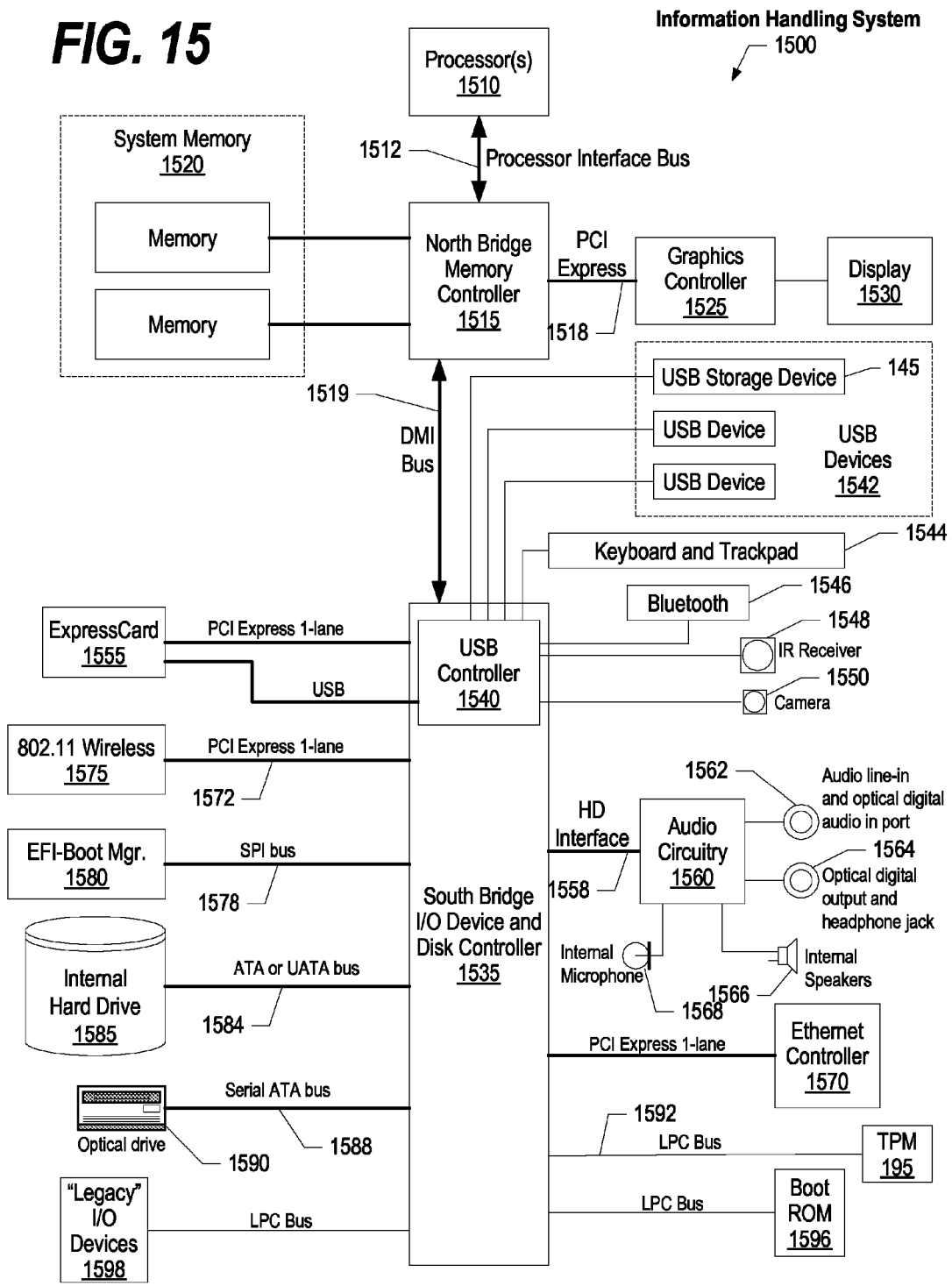
FIG. 15 is a block diagram example of an information handling system in which the methods described herein can be implemented.

FIG. 15 illustrates information handling system 1500, which is a simplified example of a computer system capable of performing the computing operations described herein. Information handling system 1500 includes one or more processors 1510 coupled to processor interface bus 1512. Processor interface bus 1512 connects processors 1510 to Northbridge 1515, which is also known as the Memory Controller Hub (MCH). Northbridge 1515 connects to system memory 1520 and provides a means for processor(s) 1510 to access the system memory. Graphics controller 1525 also connects to Northbridge 1515. In one embodiment, PCI Express bus 1518 connects Northbridge 1515 to graphics controller 1525. Graphics controller 1525 connects to display device 1530, such as a computer monitor.

Northbridge 1515 and Southbridge 1535 connect to each other using bus 1519. In one embodiment, the bus is a Direct Media Interface (DMI) bus that transfers data at high speeds in each direction between Northbridge 1515 and Southbridge 1535. In another embodiment, a Peripheral Component Interconnect (PCI) bus connects the Northbridge and the Southbridge. Southbridge 1535, also known as the I/O Controller Hub (ICH) is a chip that generally implements capabilities that operate at slower speeds than the capabilities provided by the Northbridge. Southbridge 1535 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 1596 and "legacy" I/O devices (using a "super I/O" chip). The "legacy" I/O devices (1598) can include, for example, serial and parallel ports, keyboard, mouse, and/or a floppy disk controller. The LPC bus also connects Southbridge 1535 to Trusted Platform Module (TPM) 1595. Other components often included in Southbridge 1535 include a Direct Memory Access (DMA) controller, a Programmable Interrupt Controller (PIC), and a storage device controller, which connects Southbridge 1535 to nonvolatile storage device 1585, such as a hard disk drive, using bus 1584.

ExpressCard 1555 is a slot that connects hot-pluggable devices to the information handling system. ExpressCard 1555 supports both PCI Express and USB connectivity as it connects to Southbridge 1535 using both the Universal Serial Bus (USB) the PCI Express bus. Southbridge 1535 includes USB Controller 1540 that provides USB connectivity to devices that connect to the USB. These devices include webcam (camera) 1550, infrared (IR) receiver 1548, keyboard and trackpad 1544, and Bluetooth device 1546, which provides for wireless personal area networks (PANs). USB Controller 1540 also provides USB connectivity to other miscellaneous USB connected devices 1542, such as a mouse, removable nonvolatile storage device 1545, modems, network cards, ISDN connectors, fax, printers, USB hubs, and many other types of USB connected devices. While removable nonvolatile storage device 1545 is shown as a USB-connected device, removable nonvolatile storage device 1545 could be connected using a different interface, such as a Firewire interface, etcetera.

Wireless Local Area Network (LAN) device 1575 connects to Southbridge 1535 via the PCI or PCI Express bus 1572. LAN device 1575 typically implements one of the IEEE 802.11 standards of over-the-air modulation techniques that all use the same protocol to wirelessly communicate between information handling system 1500 and another computer system or device. Optical storage device 1590 connects to Southbridge 1535 using Serial ATA (SATA) bus 1588. Serial ATA adapters and devices communicate over a high-speed serial link. The Serial ATA bus also connects Southbridge 1535 to other forms of storage devices, such as hard disk drives. Audio circuitry 1560, such as a sound card, connects to Southbridge 1535 via bus 1558. Audio circuitry 1560 also provides functionality such as audio line-in and optical digital audio in port 1562, optical digital output and headphone jack 1564, internal speakers 1566, and internal microphone 1568. Ethernet controller 1570 connects to Southbridge 1535 using a bus, such as the PCI or PCI Express bus. Ethernet controller 1570 connects information handling system 1500 to a computer network, such as a Local Area Network (LAN), the Internet, and other public and private computer networks.

While FIG. 15 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A method comprising:
   selecting a first database corresponding to a first schema and selecting a second database corresponding to a second schema;
   generating, by a processor, a schema table based upon the first database and the second database;
   destructuring, by the processor, the schema table, resulting in a destructured schema table, the destructured schema table including a first entry corresponding to the first database and a second entry corresponding to the second database;
   wherein the destructuring the schema table comprises:
      separating metadata of the schema table into at least one of schema objects and data objects;
      assigning the first entry to a first OWL:Class and assigning the second entry to a second OWL:Class;
      assigning an OWL:individual to each of the first OWL:Class and the second OWL:Class;
   selecting a property map that links the first entry to the second entry;
   restructuring, by the processor, the destructured schema table using the selected property map, resulting in a restructured schema table, wherein the restructured schema table provides a single point of entry to query data from the first database and the second database; and
   processing a user query using the restructured schema table.

2. The method of claim 1 wherein:
   the schema table includes a first data object corresponding to the first database and a second data object corresponding to the second database; and
   the destructuring further comprises:
      disassociating the first data object from the first schema, resulting in the first entry; and
      disassociating the second data object from the second schema, resulting in the second entry.

3. The method of claim 1 wherein the property map identifies a logical chain from a parent OWL:Individual to a child OWL:Individual.

4. The method of claim 1 wherein the first database corresponds to a fact table and the second database corresponds to a first dimension table, and wherein:
   the destructured schema table includes a third entry corresponding to a third database, the third database corresponding to a second dimension table; and the restructured schema table corresponds to the first database, the second database, and the third database.

5. The method of claim 1 wherein processing the user query further comprises querying the first database and querying the second database.

6. The method of claim 1 wherein the first schema is different from the second schema.

7. The method according to claim 1, wherein the property map is a Web Ontology Language (OWL) property map.

8. The method according to claim 1, wherein the generating comprises generating the schema table based upon the first database and the second database including table information, column information, and constraint information of the first database and the second database.

9. The method according to claim 1, wherein the destructured relational schema table is a flat file.

10. An information handling device comprising:
one or more processors;
a memory accessible by at least one of the processors;
a nonvolatile storage area accessible by at least one of the processors;
a set of instructions stored in the memory and executed by at least one of the processors in order to perform actions of:
selecting a first database corresponding to a first schema and selecting a second database corresponding to a second schema;
generating a schema table based upon the first database and the second database;
destructuring the schema table, resulting in a destructured schema table, the destructured schema table including a first entry corresponding to the first database and a second entry corresponding to the second database;
wherein the destructuring the schema table comprises:
separating metadata of the schema table into at least one of schema objects and data objects;
assigning the first entry to a first OWL:Class and assigning the second entry to a second OWL:Class;
assigning an OWL:individual to each of the first OWL:Class and the second OWL:Class;
selecting a property map that links the first entry to the second entry;
restructuring the destructured schema table using the selected property map, resulting in a restructured schema table, wherein the restructured schema table provides a single point of entry to query data from the first database and the second database; and
processing a user query using the restructured schema table.

11. The information handling device of claim 10 wherein:
the schema table includes a first data object corresponding to the first database and a second data object corresponding to the second database; and
the destructuring further comprises steps of:
disassociating the first data object from the first schema, resulting in the first entry; and
disassociating the second data object from the second schema, resulting in the second entry.

12. The information handling device of claim 10 wherein the property map identifies a logical chain from a parent OWL:Individual to a child OWL:Individual.

13. The information handling device of claim 10 wherein the first database corresponds to a fact table and the second database corresponds to a first dimension table, and wherein:
the destructured schema table includes a third entry corresponding to a third database, the third database corresponding to a second dimension table; and
the restructured schema table corresponds to the first database, the second database, and the third database.

14. The information handling device of claim 10 wherein processing the user query further comprises querying the first database and querying the second database.

15. The information handling device of claim 10 wherein the first schema is different from the second schema.

16. A computer program product comprising a non-transitory computer readable medium, comprising functional descriptive material that, when executed by an information handling system, causes the information handling system to perform actions that include:
selecting a first database corresponding to a first schema and selecting a second database corresponding to a second schema;
generating a schema table based upon the first database and the second database;
destructuring the schema table, resulting in a destructured schema table, the destructured schema table including a first entry corresponding to the first database and a second entry corresponding to the second database;
wherein the destructuring the schema table comprises:
separating metadata of the schema table into at least one of schema objects and data objects;
assigning the first entry to a first OWL:Class and assigning the second entry to a second OWL:Class;
assigning an OWL:individual to each of the first OWL:Class and the second OWL:Class;
selecting a property map that links the first entry to the second entry;
restructuring the destructured schema table using the property map, resulting in a restructured schema table, wherein the restructured schema table provides a single point of entry to query data from the first database and the second database; and
processing a user query using the restructured schema table.

17. The computer program product of claim 16 wherein:
the schema table includes a first data object corresponding to the first database and a second data object corresponding to the second database; and
the destructuring further comprises steps of:
disassociating the first data object from the first schema, resulting in the first entry; and
disassociating the second data object from the second schema, resulting in the second entry.

18. The computer program product of claim 16 wherein the property map identifies a logical chain from a parent OWL:Individual to a child OWL:Individual.

19. The computer program product of claim 16 wherein the first database corresponds to a fact table and the second database corresponds to a first dimension table, and wherein:
the destructured schema table includes a third entry corresponding to a third database, the third database corresponding to a second dimension table; and
the restructured schema table corresponds to the first database, the second database, and the third database.

20. The computer program product of claim 16 wherein processing the user query further comprises querying the first database and querying the second database.

* * * * *